H. C. ANDERSON.
AUTOMOBILE SIGNAL.
APPLICATION FILED JULY 14, 1920.

1,391,523.

Patented Sept. 20, 1921.

Inventor
Hugh C. Anderson,
By
Attorney

UNITED STATES PATENT OFFICE.

HUGH CHRISTOPHER ANDERSON, OF DETROIT, MICHIGAN.

AUTOMOBILE-SIGNAL.

1,391,523.  Specification of Letters Patent.  Patented Sept. 20, 1921.

Application filed July 14, 1920. Serial No. 396,095.

*To all whom it may concern:*

Be it known that I, HUGH CHRISTOPHER ANDERSON, a citizen of the United States of America, residing at Detroit, in the county of Wayne and State of Michigan, have invented new and useful Improvements in Automobile-Signals, of which the following is a specification.

The object of the invention is to provide a simple, inexpensive and efficient means adapted for application as an attachment to an automobile or similar vehicle for communicating to the driver of a following vehicle the intention of the driver of the vehicle carrying the signal to stop or reduce his speed of movement or to turn to the right or left. Further, it is the object to provide a device for the purpose indicated which may be used in connection with the ordinary tail end or rear light of the vehicle under such conditions as to attract the attention of vehicle drivers without involving any change in construction or location of the rear light and without in any way interfering with the usual purpose of function thereof.

The invention is illustrated and described in a specific embodiment, to which however, it is not to be restricted. The right is reserved to make such changes or alterations as the actual reduction to practice may suggest, in so far as such changes or alterations are compatible in spirit with the annexed claim.

In the accompanying drawings:—

Figure 1:
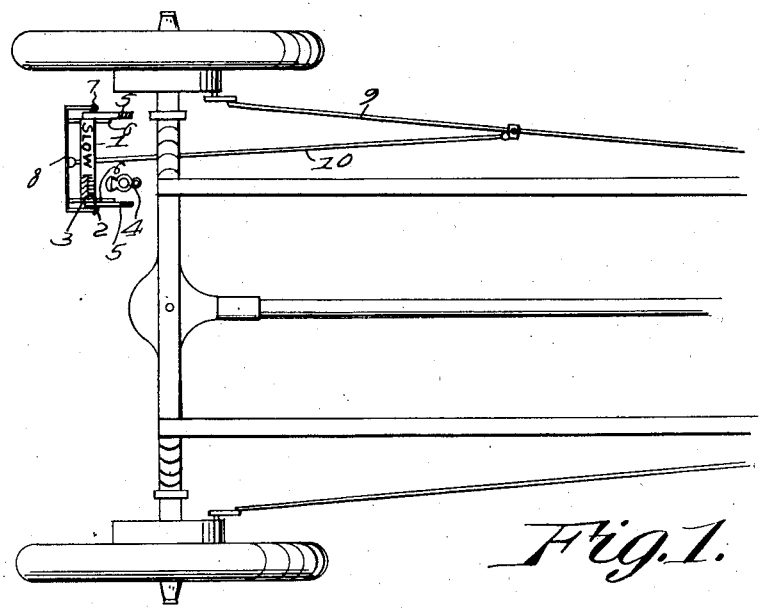
Figure 1, is a plan view of the rear portion of a vehicle chassis showing the manner in which the invention is applied.
Figure 2:
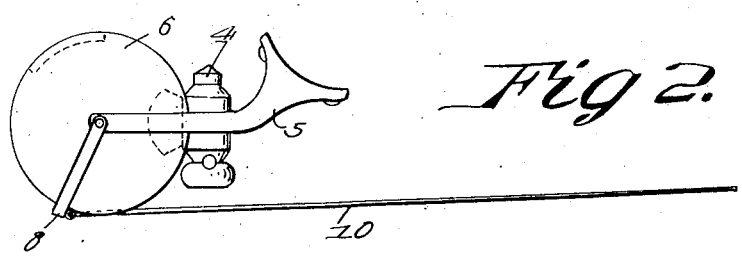
Fig. 2, is a side elevational view of the signaling device *per se.*
Figure 3:
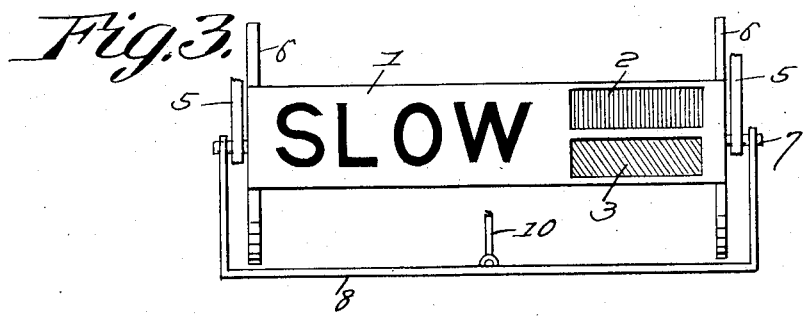
Fig. 3, is a rear elevational view of the structure of Fig. 2.

The device consists essentially of an indicator in the form of a plate or shutter 1, of transparent or translucent material suitably inscribed, as for example, with the word "Slow," disposed at one side of the shutter and at the opposite side the latter is provided with two rectangular colored zones 2 and 3 of which the upper is preferably red and the lower preferably green. The shutter is suitably supported at the rear of the vehicle for movement in front of or above the tail lamp 4 of the vehicle and when above the lamp is in a comparatively inconspicuous position. Disposed before the lamp, the shutter intercepts the light from the lamp with the result that the signal on the shutter is displayed to drivers following the vehicle equipped with the invention.

Supported from the vehicle body by a pair of spaced brackets 5 which are secured to the body are the supporting means for the shutter constituting a pair of spaced disks 6 which the shutter spans and to the peripheries of which it is secured, the disks being fixed on a shaft 7 which is rotatably mounted in the two brackets 5. Exterior to the brackets the legs of the yoke 8 connect with the shaft and are fixed thereto so that movement imparted to the yoke may serve to rotate the shaft in the brackets and thus shift the shutter from its position above the lamp to its position before the lamp so that the indicia on the shutter may be apparent.

The shutter is thrown to operative position upon the operation of the brakes of the vehicle and through the instrumentality of the brake rod 9 which is operatively connected to the yoke through a link 10, the latter being pivoted to the brake rod at a substantially intermediate point and having connection with the yoke 8 at an intermediate point. Upon throwing the brakes to effect a full stop of the vehicle the movement of the brake rod 9 and its attendant link 10 is sufficient to depress the shutter 1 to a point where the colored zone of the shield intercepts the light ray thus showing the red light and indicating "Stop." The setting of the brakes with sufficient pressure to bring the car down to a very low speed does not effect such great movement of the brake 9 and the link 10. Therefore the word "Slow" becomes the conspicuous indication on the shutter. Less movement still of the brake rod 9 will, while moving the shutter before the light, be only sufficient to bring the colored shield 3 within a position to intercept the rays of the light with the result that the green indication is made apparent. Upon the release of the brake after the same has once been operated with the intention of resuming the former speed, the indicator is withdrawn or returned to its normal or approximately horizontal position to permit the usual functioning of the rear end or tail light.

The invention having been described, what is claimed as new and useful is:—

A rear end signal for automobiles and the like comprising spaced brackets for attachment to a vehicle body, a pair of disks, a light penetrable indicator plate or shutter spanning said disks and secured to the periphery thereof, a shaft on which the disks are carried, the shaft being rotatably mounted in the brackets, a yoke connected with the shaft and spanning the brackets, and a link pivotally connected with the yoke and adapted for pivotal connection with the brake rod of the vehicle.

In testimony whereof I affix my signature.

HUGH CHRISTOPHER ANDERSON.